United States Patent Office 3,381,770
Patented May 7, 1968

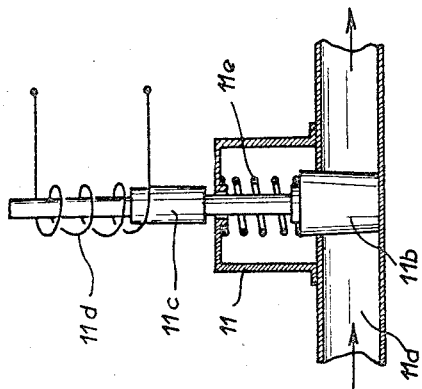
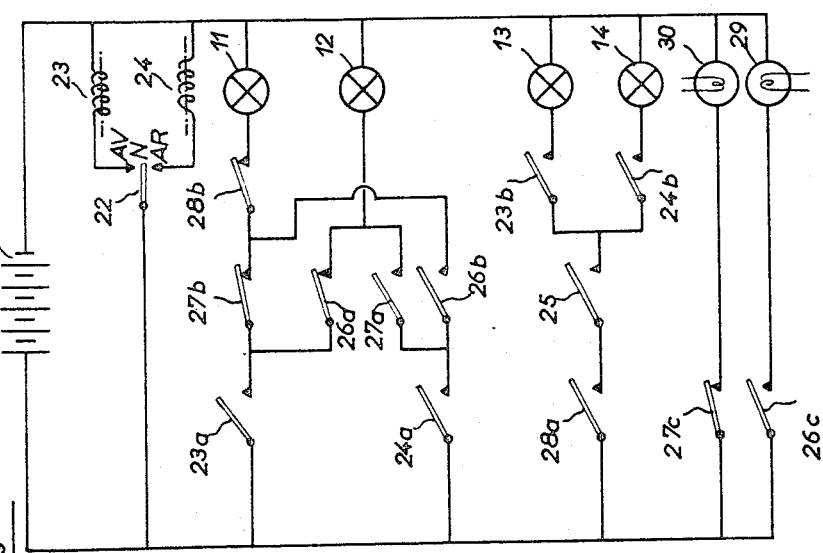

3,381,770
REVERSING SERVO-CONTROL DEVICE
Jean Fauchere, Bourg-la-Reine, Seine, France, assignor to Richier, Societe Anonyme, Paris, France, a company of France
Filed Apr. 25, 1966, Ser. No. 544,779
Claims priority, application France, Apr. 29, 1965, 15,209
2 Claims. (Cl. 180—77)

ABSTRACT OF THE DISCLOSURE

A reversing servo-control device for a vehicle comprising, in combination with the engine, the clutch, the gearbox, the reverser and the brakes as generally used in a vehicle, actuating hydraulic means respectively associated with said brakes, clutch and reverser, electrically operated valve means associated with said hydraulic means, and a control lever having forward, neutral and backward positions, normally being in the neutral position, and which, when maintained in forward or backward position determines the operation in succession of said hydraulic means by the intermediary of said valve means.

---

This invention relates to a reverse running servo-control device, applicable in particular to public works machinery.

In use, public works machines like tamping rollers, compactors, tracked vehicles, and the like, are frequently called upon to move back and forth, thus compelling the driver to execute numerous reversals. The execution of each such reversal calls for a whole sequence of operations on the part of the driver, namely braking, disengaging the clutch, engaging reverse and then reengaging the clutch, thus entailing considerable exertion for the driver and slowing down the work done by the machine.

The object of the invention is to provide a reversing servo-control device which, through one operation of a single control lever, permits the operator to automatically reverse the machine.

More specifically, it is an object of the invention to provide a reversing servo-control device for a vehicle comprising in combination with the engine, the clutch, the gearbox, the reverser and the brakes as generally used in a vehicle, a fluid circuit which feeds first actuating hydraulic means associated with said brakes, second actuating hydraulic means associated with said clutch and third actuating double acting hydraulic means associated with said reverser, an electric circuit, valves operated by said electric circuit, mounted on said fluid circuit and associated with each of said actuating means, a control level mounted on said electric circuit and having forward, neutral and backward positions, said lever normally being in the neutral position, which, when maintained in forward or backward position, determines opening of said valves associated with said first and second actuating means so as to set the brakes and to disengage the clutch, a tachometer switching member closing the valve associated with said first actuating means when the speed of the vehicle has dropped below a predetermined value so as to release the brakes, a switching member cooperating with said second actuating means and being actuated upon operation thereof and opening that of the valves associated with said third actuating double-acting means which corresponds to the selected forward or backward positions when said clutch is in its disengaged position, so as to reverse the vehicle, and two switching members cooperating with said third actuating means and being actuated upon operation thereof and closing the valve associated with said second actuating means so as to re-engage the clutch after reversal of the motion.

In a preferred form of embodiment of the invention, the reversing servo-control device is associated with a reversing servo-control device associated with individual manually operable means for operating respectively said brakes, clutch and reverser whereby the driver is enabled to take control of the vehicle in the event of failure of said device.

The description which follows with reference to the accompanying non-limitative exemplary drawings will give a clear understanding of how the invention can be carried into practice.

In the drawings:

FIGURE 2 is a diagram of the electric circuitry for controlling said elements; and FIGURE 3 is a diagrammatic illustration of an electrically operated valve usable for performing the present invention.

Figure 1:
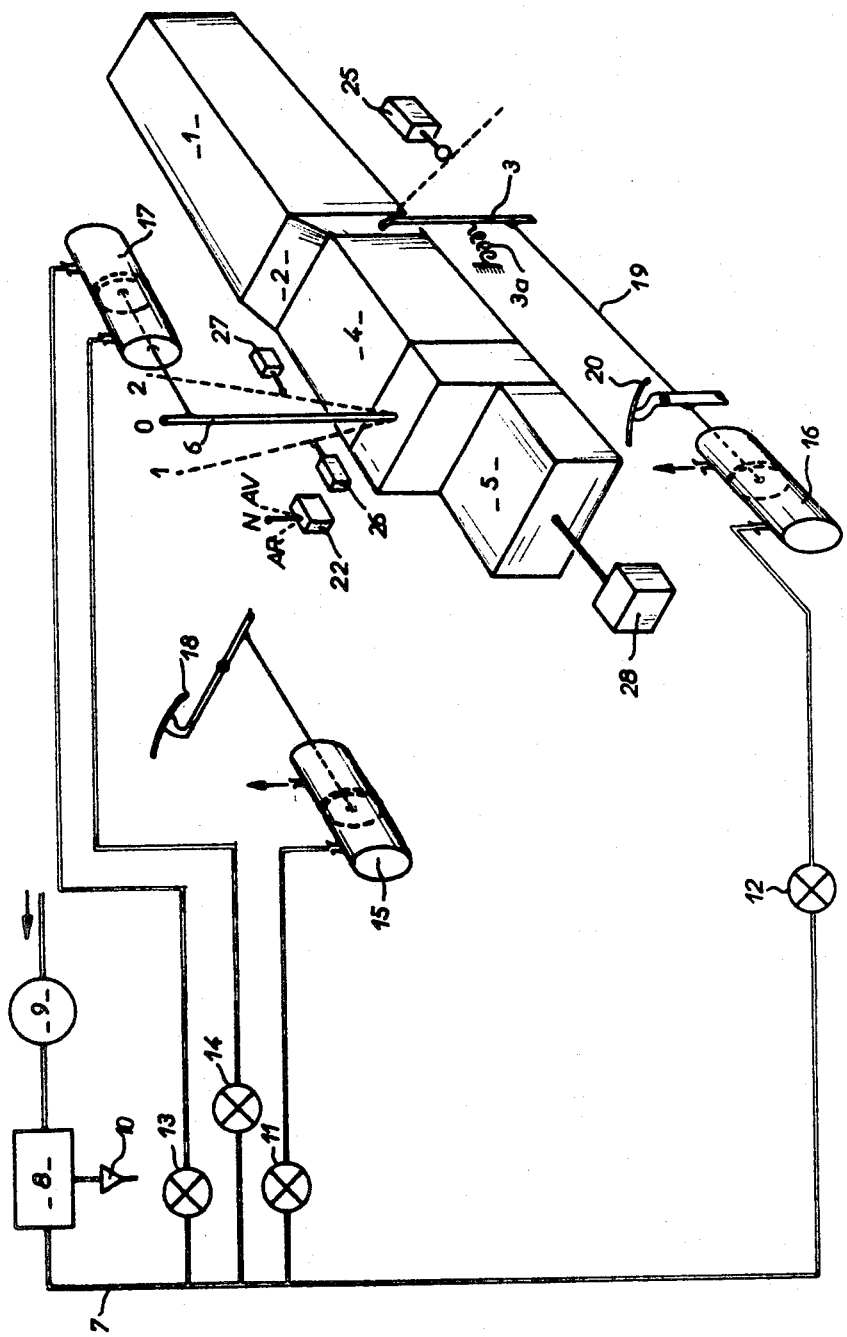
FIGURE 1 shows diagrammatically the fluid circuit and control elements associated to the different operations required to obtain reverse running.

Reference is first had to FIGURES 1 and 2, in which a vehicle comprising an engine 1, a clutch 2 with control lever 3 thereof (which is urged into the clutch-engagement position by a spring 3a), a gear box 4, a reverser 5 and control lever 6 thereof, is equipped with a reverse running servo-control device according to the invention. Said device includes a fluid circuit 7 supplied with compressed air by an accumulator 8 and a compressor 9 connected in series, a pressure limiter 10 being provided on accumulator 8 to prevent air overpressures. Circuit 7 permits of pneumatically controlling, through the agency of electrically operated valves 11 and 12 respectively, a brake cylinder 15 and clutch cylinder 16, further electrically operated valves 13 and 14 controlling a double-acting reverse-running cylinder 17. When set under pressure, brake cylinder 15 causes brake fluid to be supplied to the brakes associated to the vehicle wheels (not shown). Brake cylinder 15 can also be foot-controlled by the driver through a pedal 18. Clutch cylinder 16 operates on clutch lever 3 through a rod 19, but said lever may alternatively be operated by means of a pedal 20. Reverse-running cylinder 17 operates on reversing lever 6 and can assume one of three positions 1, 0 or 2, corresponding respectively to forward running, stopping and reverse running of the vehicle. The device further includes an electric circuit energized by a source of current 21, which circuit includes a driver-operated control lever 22 which can be set in any of three positions marked AV(Forward) N(Neutral) and AR(Reverse) and which is urged automatically into the Neutral position when the driver ceases to exert force in the Forward or Reverse direction, two relays 23 and 24 selectively energizable according to the position of lever 22 and respectively controlling associated switches 23a, 23b and 24a, 24b, a contactor 25 which is engaged by clutch lever 3 when the same is in the clutch-disengaged position, two contactors 26 and 27 cooperating with reversing lever 6 and each controlling three switches 26a, 26b, 26c and 27a, 27b, 27c respectively, said contactors 26 and 27 being operated respectively when lever 6 is in position 1 or 2, a tachometer-type contactor 28 linked to the vehicle wheels and operating two switches 28a and 28b, and two signalling devices 29 and 30 series-connected respectively to switches 26c and 27c. FIGURE 2 clearly shows the way in which the various electrical components and the electrically operated valves 11 through 14 are connected to one another.

FIGURE 3 schematically illustrates one such electrically operated valve, such as the valve 11, which may be used when carrying the present invention into practice. This valve includes a fluid inlet and outlet conduit 11a adapted to be covered or uncovered, by a sliding member 11b rigidly connected to the movable armature 11c of an electromagnet consisting of said armature and a solenoid 11d, according as said solenoid is or is not energized, said sliding part being biased into the closed position by a spring 11e when solenoid 11d is de-energized.

To illustrate the principle of operation of the subject device of this invention, consider a vehicle running in reverse:

Lever 22 is in the neutral position N,

Lever 6 is in position 2 (reverse) and switches 27a, 27b and 27c (signal device 30 lit) are respectively open, closed and closed (configuration shown in FIGURE 2)

Clutch lever 3 is in the clutch-engaging position and switch 25 is in the open position.

Since the speed of the vehicle is higher than a certain preset value, tachometer switch 28 is in such a position that switches 28a and 28b are open and closed respectively, while switches 26a, 26b and 26c are closed, open and open respectively.

If the driver wishes to engage forward drive, he pushes lever 22 towards the Forward position and holds it there while at the same time releasing the accelerator pedal (not shown). As a result, relay 23 is energized and closes switches 23a and 23b. Switches 23a, 27b and 28b being on, electrically operated valve 11 opens and permits brake cylinder 15 to set the brakes so as to slow down the vehicle. Electrically operated valve 12 opens at the same time (being energized via switches 23a and 26a) clutch cylinder 16 is fed with air and disengages clutch 2. Upon disengaging being completed, lever 3 closes switch 25.

As soon as the speed of the vehicle has dropped below a value to preset to permit the reversing, tachometer contactor 28 closes switch 28a and opens switch 28b. Switch 28b being open, electrically operated valve 11 closes and thereby releases the brakes, while electrically operated valve 13 opens (switches 28a, 25 and 23b being closed) and permits feeding of cylinder 17, causing the reversing lever 6 to move from position 2 to position 1 (forward drive). During this operation, contactor 27 is disengaged and contactor 26 is engaged whereby switches 26b, 26c and 27a are on and switches 26a, 27b and 27c are off, thereby causing:

(1) Closure of valves 12 and 13 and, as a result, bringing of the clutch lever into the clutch-engaging position;

(2) Extinction of signal device 30 and lighting up of signal device 29.

The driver then releases control lever 22, which goes to the neutral position. He then accelerates and the vehicle moves off forwardly. When the speed exceeds the speed set for reversing, switch 28b closes and switch 28a opens.

The sequence of operations for switching from forward motion to backward motion can be deduced from the sequence hereinbefore described for the change from backward motion to forward motion.

It goes without saying that modifications can be made to the form of embodiment hereinbefore described without departing from the spirit and scope of the invention.

More particularly, the various motions could be controlled by a hydraulic fluid other than compressed air without affecting the principle of the invention.

What is claimed is:

1. A reversing servo-control device for a vehicle comprising in combination with the engine, the clutch, the gearbox, the reverser and the brakes as generally used in a vehicle, a fluid circuit which feeds first actuating hydraulic means associated with said brakes, second actuating hydraulic means associated with said clutch and third actuating double acting hydraulic means associated with said reaverser, an electric circuit, valves operated by said electric circuit, mounted on said fluid circuit and associated with each of said actuating means, a control lever mounted on said electric circuit and having forward, neutral and backward positions, said lever normally being in the neutral position, which, when maintained in forward or backward position, determines opening of said valves associated with said first and second actuatnig means so as to set the brakes and to disengage the clutch, a tachometer switching member closing the valve associated with said first actuating means when the speed of the vehicle has dropped below a predetermined value so as to release the brakes, a switching member cooperatig with said second actuating means and being actuated upon operation thereof and opening that of the valves associated with said third actuating double-acting means which corresponds to the selected forward or backward positions when said clutch is in its disengaged position, so as to reverse the vehicle, and two switching members cooperating with said third actuating means and being actuated upon operation thereof and closing the valve associated with said second actuating means so as to re-engage the clutch after reversal of the motion.

2. A reversing servo-control device as claimed in claim 1, associated with individual manually operable means for operating respectively said brakes, clutch and reverser whereby the driver is enabled to take control of the vehicle in the event of failure of said device.

References Cited

UNITED STATES PATENTS 1,294,317 2/1919 Staude et al.
1,567,603 12/1925 King.

A. HARRY LEVY, *Primary Examiner.*